United States Patent
Chun et al.

(10) Patent No.: US 10,122,441 B2
(45) Date of Patent: *Nov. 6, 2018

(54) METHOD OF UTILIZING A RELAY NODE IN WIRELESS COMMUNICATION SYSTEM

(71) Applicant: LG ELECTRONICS INC., Seoul (KR)

(72) Inventors: Sung-Duck Chun, Gyeonggi-Do (KR);
Seung-June Yi, Gyeonggi-Do (KR);
Sung-Hoon Jung, Gyeonggi-Do (KR);
Sung-Jun Park, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/465,245

(22) Filed: Mar. 21, 2017

(65) Prior Publication Data
US 2017/0214459 A1    Jul. 27, 2017

Related U.S. Application Data

(63) Continuation of application No. 13/256,919, filed as application No. PCT/KR2010/002503 on Apr. 21, 2010, now Pat. No. 9,654,256.
(Continued)

(51) Int. Cl.
*H04W 40/22* (2009.01)
*H04B 7/26* (2006.01)
(Continued)

(52) U.S. Cl.
CPC .......... *H04B 7/2606* (2013.01); *H04W 76/12* (2018.02); *H04W 76/27* (2018.02); *H04W 84/047* (2013.01)

(58) Field of Classification Search
CPC ... H04B 7/2606; H04L 1/1614; H04L 1/1635; H04L 2001/0097; H04W 76/022; H04W 72/0426; H04W 76/046
See application file for complete search history.

(56) References Cited

U.S. PATENT DOCUMENTS

| 8,724,648 | B2 | 5/2014 | Zeng et al. | |
|---|---|---|---|---|
| 2004/0185837 | A1* | 9/2004 | Kim | H04H 60/91 455/414.3 |

(Continued)

FOREIGN PATENT DOCUMENTS

| CN | 1279541 | 1/2001 |
|---|---|---|
| CN | 1902868 | 1/2007 |

(Continued)

OTHER PUBLICATIONS

Freescale Semiconductor, "Long Term Evolution Protocol Overview", Document No. LTEPTCLOVWWP, Oct. 2008, 21 pages.
(Continued)

*Primary Examiner* — Wutchung Chu
(74) *Attorney, Agent, or Firm* — Lee Hong Degerman Kang Waimey (57) ABSTRACT

The present invention relates to a wireless communication system and a user equipment (UE) providing wireless communication services, and more particularly, a method of preventing transmission error of data while maintaining its security and a method of controlling an access of a Relay Node (RN) to a Donor eNB (DeNB) and an access of the UE to the RN during a process of transmitting and receiving user data when the RN as a radio network node is connected to the DeNB in an Evolved Universal Mobile Telecommunications System (E-UMTS), a Long Term Evolution (LTE)
(Continued)

system, and a LTE-Advanced (LTE-A) system that have evolved from a Universal Mobile Telecommunications System (UMTS).

15 Claims, 7 Drawing Sheets

Related U.S. Application Data (60) Provisional application No. 61/171,440, filed on Apr. 21, 2009, provisional application No. 61/173,181, filed on Apr. 27, 2009, provisional application No. 61/173,962, filed on Apr. 29, 2009.

(51) Int. Cl.
*H04W 76/12* (2018.01)
*H04W 84/04* (2009.01)
*H04W 76/27* (2018.01)

(56) References Cited

U.S. PATENT DOCUMENTS

| | | | |
|---|---|---|---|
| 2005/0002407 A1* | 1/2005 | Shaheen | H04L 51/066 370/401 |
| 2006/0067238 A1 | 3/2006 | Olsson et al. | |
| 2006/0084470 A1* | 4/2006 | Hashimoto | H04W 76/12 455/552.1 |
| 2007/0097945 A1 | 5/2007 | Wang et al. | |
| 2007/0160014 A1 | 7/2007 | Larsson | |
| 2007/0253444 A1 | 11/2007 | Poyhonen et al. | |
| 2008/0039094 A1* | 2/2008 | Jeong | H04W 76/02 455/436 |
| 2008/0294958 A1 | 11/2008 | Lee et al. | |
| 2009/0141668 A1 | 6/2009 | Zhang et al. | |
| 2009/0262684 A1* | 10/2009 | Khetawat | H04L 63/104 370/328 |
| 2010/0103862 A1* | 4/2010 | Ulupinar | H04L 29/12207 370/315 |
| 2010/0142433 A1 | 6/2010 | Womack et al. | |
| 2010/0157845 A1* | 6/2010 | Womack | H04B 7/2606 370/254 |
| 2010/0260097 A1* | 10/2010 | Ulupinar | H04B 7/2606 370/315 |
| 2011/0134827 A1* | 6/2011 | Hooli | H04W 72/04 370/315 |
| 2011/0194485 A1* | 8/2011 | Horneman | H04W 72/042 370/315 |
| 2012/0002592 A1* | 1/2012 | Yang | H04B 7/155 370/315 |
| 2012/0002594 A1* | 1/2012 | Racz | H04B 7/15557 370/315 |
| 2012/0003962 A1* | 1/2012 | Jeon | H04W 36/0083 455/411 |
| 2012/0008776 A1* | 1/2012 | Ishida | H04W 12/04 380/247 |
| 2012/0028631 A1 | 2/2012 | Chun et al. | |
| 2012/0202491 A1* | 8/2012 | Fox | H04B 7/2609 455/435.1 |

FOREIGN PATENT DOCUMENTS

| | | |
|---|---|---|
| CN | 1918924 | 2/2007 |
| CN | 101291527 | 10/2008 |
| WO | 2007139338 | 12/2007 |
| WO | 2008114214 | 9/2008 |
| WO | 2010/123279 | 10/2010 |

OTHER PUBLICATIONS

Japan Patent Office Application Serial No. 2012-507151, Office Action dated Mar. 18, 2014, 3 pages.
State Intellectual Property Office of the Peoples Republic of China Application Serial No. 201410219380.8, Office Action dated Dec. 28, 2016, 5 pages.
3rd Generation Partnership Project, "Radio Resource Control (Release 6)", 3GPP TS 25.331 V6.19.0, Sep. 2008, 1252 pages.
The State Intellectual Property Office of the People's Republic of China Application Serial No. 201080017526.0, Office Action dated Jan. 6, 2014, 6 pages.
The State Intellectual Property Office of the People's Republic of China Application Serial No. 201080017526.0, Notice of Allowance dated Feb. 16, 2016, 4 pages.
Ericsson, "Discussion on RAN1 preferences for relaying", R1-090379, TSG-RAN WG1 #55bis, Jan. 2009, 4 pages.
Motorola, "Long Term Evolution (LTE)", 2008, 15 pages.
CMCC, "Discussions on Functionality Partition of Relay in RAN2", R2-092407, 3GPP TSG-RAN WG2 Meeting #65bis, Mar. 2009, 4 pages.
Huawei, "Further details and considerations of different types of relays", R1-083712, 3GPP TSG-RAN-WG1 Meeting #54bis, Sep. 2008, 6 pages.
Japan Patent Office Application Serial No. 2012-507151, Office Action dated Apr. 2, 2013, 3 pages.

* cited by examiner

METHOD OF UTILIZING A RELAY NODE IN WIRELESS COMMUNICATION SYSTEM

CROSS-REFERENCE TO RELATED APPLICATIONS

This application is a continuation of U.S. patent application Ser. No. 13/256,919, filed on Sep. 15, 2011, now U.S. Pat. No. 9,654,256, which is the National Stage filing under 35 U.S.C. 371 of International Application No. PCT/KR2010/002503, filed on Apr. 21, 2010, which claims the benefit of U.S. Provisional Application Nos. 61/171,440, filed on Apr. 21, 2009, 61/173,181, filed on Apr. 27, 2009, and 61/173,962, filed on Apr. 29, 2009, the contents of which are all incorporated by reference herein in their entirety.

TECHNICAL FIELD

The present invention relates to a wireless communication system and a user equipment (UE) providing wireless communication services, and more particularly, a method of preventing transmission error of data while maintaining its security and a method of controlling an access of a Relay Node (RN) to a Donor eNB (DeNB) and an access of the UE to the RN during a process of transmitting and receiving user data when the RN as a radio network node is connected to the DeNB in an Evolved Universal Mobile Telecommunications System (E-UMTS), a Long Term Evolution (LTE) system, and a LTE-Advanced (LTE-A) system that have evolved from a Universal Mobile Telecommunications System (UMTS).

BACKGROUND ART

First, the LTE system is a mobile communication system that has evolved from a UMTS system, and the standard has been established by 3rd Generation Partnership Project (3GPP), which is an international standardization organization.

Figure 1:
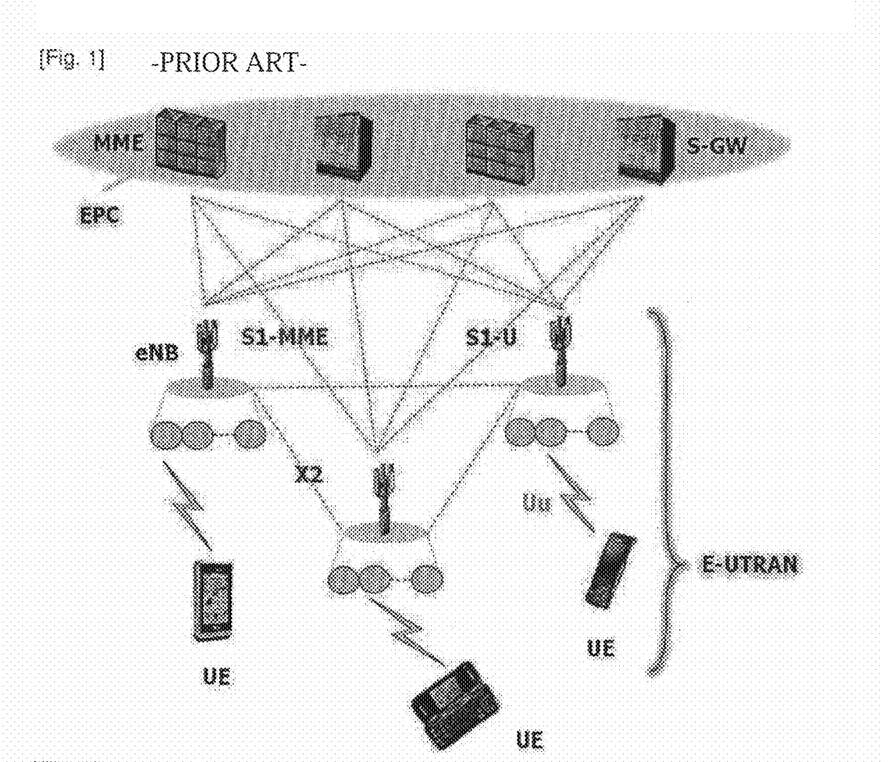
FIG. 1 is a view illustrating the network architecture of an LTE system, which is a mobile communication system to which the related art and the present invention are applied.

FIG. 1 is a view illustrating the network architecture of an LTE system, which is a mobile communication system to which the related art and the present invention are applied.

As illustrated in FIG. 1, the LTE system architecture can be roughly classified into an Evolved UMTS Terrestrial Radio Access Network (E-UTRAN) and an Evolved Packet Core (EPC). The E-UTRAN may include a user equipment (UE) and an Evolved NodeB (eNB, base station), wherein the connection between UE-eNB is called a Uu interface, and the connection between eNB-eNB is called an X2 interface. The EPC may include a Mobility Management Entity (MME) performing a control-plane function and a Serving Gateway (S-GW) performing a user-plane function, wherein the connection between eNB-MME is called an S1-MME interface, and the connection between eNB-S-GW is called an S1-U interface, and both connections may be commonly called an S1 interface.

Figure 2:
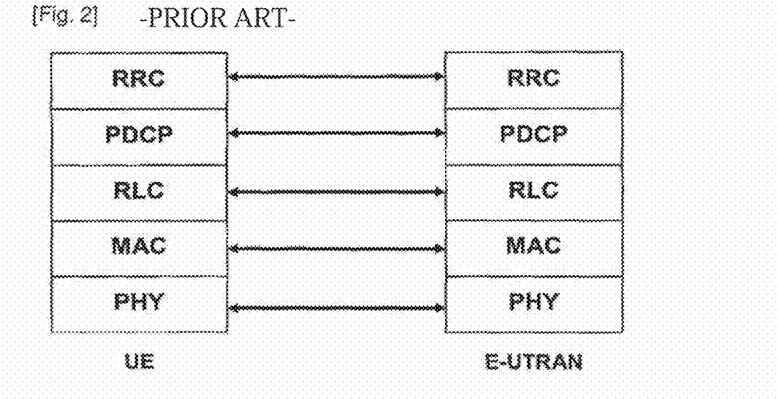
FIG. 2 is an exemplary view illustrating the control plane architecture of a radio interface protocol between UE and E-UTRAN in an LTE system, which is a mobile communication system to which the related art and the present invention are applied.
Figure 3:
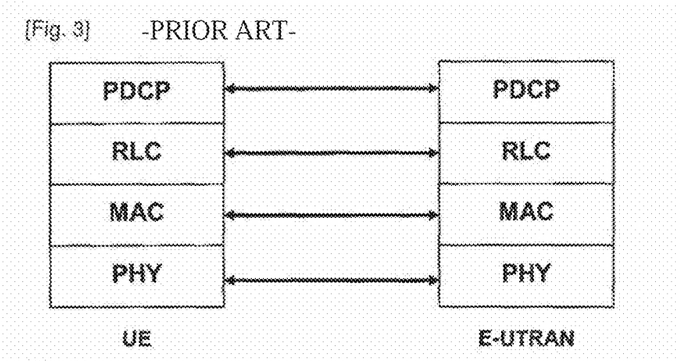
FIG. 3 is an exemplary view illustrating the user plane architecture of a radio interface protocol between UE and E-UTRAN in an LTE system, which is a mobile communication system to which the related art and the present invention are applied.

A radio interface protocol is defined in the Uu interface which is a radio section, wherein the radio interface protocol is horizontally comprised of a physical layer, a data link layer, a network layer, and vertically classified into a user plane (U-plane) for user data transmission and a control plane (C-plane) for signaling transfer. Such a radio interface protocol can be typically classified into L1 (first layer) including a PHY layer which is a physical layer, L2 (second layer) including MAC/RLC/PDCP layers, and L3 (third layer) including a RRC layer as illustrated in FIGS. 2 and 3. Those layers exist as a pair in the UE and E-UTRAN, thereby performing data transmission of the Uu interface.

FIGS. 2 and 3 are exemplary views illustrating the control plane and user plane architecture of a radio interface protocol between UE and E-UTRAN in an LTE system, which is a mobile communication system to which the related art and the present invention are applied.

The physical layer (PHY) which is a first layer provides information transfer services to the upper layers using a physical channel. The PHY layer is connected to the upper Medium Access Control (MAC) layer through a transport channel, and data between the MAC layer and the PHY layer is transferred through the transport channel. At this time, the transport channel is roughly divided into a dedicated transport channel and a common transport channel based on whether or not the channel is shared. Furthermore, data is transferred between different PHY layers, i.e., between PHY layers at the transmitter and receiver sides.

Various layers exist in the second layer. First, the Medium Access Control (MAC) layer serves to map various logical channels to various transport channels, and also performs a logical channel multiplexing for mapping several logical channels to one transport channel. The MAC layer is connected to an upper Radio Link Control (RLC) layer through a logical channel, and the logical channel is roughly divided into a control channel for transmitting control plane information and a traffic channel for transmitting user plane information according to the type of information to be transmitted.

The Radio Link Control (RLC) layer of the second layer manages segmentation and concatenation of data received from an upper layer to appropriately adjust a data size such that a lower layer can send data to a radio section. Also, the RLC layer provides three operation modes such as a transparent mode (TM), an un-acknowledged mode (UM) and an acknowledged mode (AM) so as to guarantee various quality of services (QoS) required by each radio bearer (RB). In particular, AM RLC performs a re-transmission function through an automatic repeat and request (ARQ) function for reliable data transmission.

A Packet Data Convergence Protocol (PDCP) layer of the second layer performs a header compression function for reducing the size of an IP packet header which is relatively large in size and contains unnecessary control information to efficiently transmit IP packets, such as IPv4 or IPv6, over a radio section with a relatively small bandwidth. Due to this, information only required from the header portion of data is transmitted, thereby serving to increase the transmission efficiency of the radio section. In addition, in the LTE system, the PDCP layer performs a security function, which includes ciphering for preventing the third person's data wiretapping and integrity protection for preventing the third person's data manipulation.

A radio resource control (RRC) layer located at the uppermost portion of the third layer is only defined in the control plane. The RRC layer performs a role of controlling logical channels, transport channels and physical channels in relation to configuration, re-configuration, and release of Radio Bearers (RBs). Here, the RB denotes a logical path provided by the first and the second layers for transferring data between the UE and the UTRAN. In general, the establishment of the RB refers to a process of stipulating the characteristics of protocol layers and channels required for providing a specific service, and setting each of the detailed parameter and operation method thereof. The RB is divided into a signaling RB (SRB) and a data RB (DRB), wherein the SRB is used as a path for transmitting RRC messages in the C-plane while the DRB is used as a path for transmitting user data in the U-plane.

In general, when there is data to be transmitted to the UE, the base station transmits the data to the UE, and then waits receipt notification from the UE. If it is notified that the UE has successfully received data, then the base station deletes the data from its own buffer. However, if it is notified that the UE has not successfully received data, then the base station retransmits the data.

However, it is difficult to make a direct data transmission and reception between the base station and the UE due to the introduction of a relay node (RN). In other words, even if the base station has successfully transferred the data to the relay node, the base station is unable to know whether or not the data has been successfully transferred from the relay node to the UE. Similarly, from a standpoint of the UE, even if the UE has successfully transferred the data to the relay node, the UE is unable to know whether or not the data block has successfully transferred from the relay node to the base station.

Typically, each UE has a possibility of continuously moving its location over a mobile communication system. For example, if data blocks 1, 2, and 3 have been successfully transferred from the base station to the relay node, the base station can delete the data blocks 1, 2, and 3 from its own buffer. Then, the relay node will start to transmit the data blocks 1, 2, and 3 to the UE. In this situation, it may happen that the UE moves to a new area while the relay node transmits the data block to the UE. In case where the UE is out of the connected relay node, there may be a problem of occurring a data block that cannot be successfully transferred to the UE among the data blocks received from the base station to the relay node.

Furthermore, every base station (eNB) does not support RN. For example, Rel-8 eNB does not support RN. In this case, the RN should not attempt an access to a Donor eNB (DeNB). If the RN is accessed to an eNB that does not support RN, data generated by the RN itself may be processed to be transferred by the eNB but data generated by the UE that has been accessed to the RN cannot be processed by the eNB. In this case, the UE that has been accessed to the RN merely consumes the radio resources and battery, but is unable to receive any services.

In addition, if an additional access of the UE to the RN occurs when an amount of radio resources allocated to the RN is limited over an Un interface, then a radio al-location amount to the LIE is limited, thereby causing a problem that the UE cannot properly receive services or another UE cannot properly receive services if the priority of the UE is higher. As a result, the RN cannot allow an access from the UEs with no particular plan in view, thereby requiring a suitable control method for managing this.

DISCLOSURE OF INVENTION

Solution to Problem

Accordingly, an object of the present invention is to provide a method of effectively transmitting or receiving data blocks between RN and UE in an LTE-A system and an effective access control method thereof.

In order to solve the foregoing problem, the present invention proposes a method of reporting a status report in a wireless communication system, the method comprising: receiving, by a first protocol entity, data from a second protocol entity; transmitting, by the first protocol entity, the received data to a third protocol entity; receiving a status report from the third protocol entity, wherein at least one status report indicate any unsuccessfully received data by the third protocol entity; and transmitting the status report to the second protocol entity.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

The present invention may be applied to a 3GPP communication technology, particularly to a Universal Mobile Telecommunications System (UMTS), system, and a communication device and method thereof. However, the present invention is not limited to this, but may be applied to every wire/wireless communication to which technical spirit of the present invention can be applied.

Hereinafter, the construction and operation of preferred embodiments according to the present invention will be described with reference to the accompanying drawings.

Figure 4:
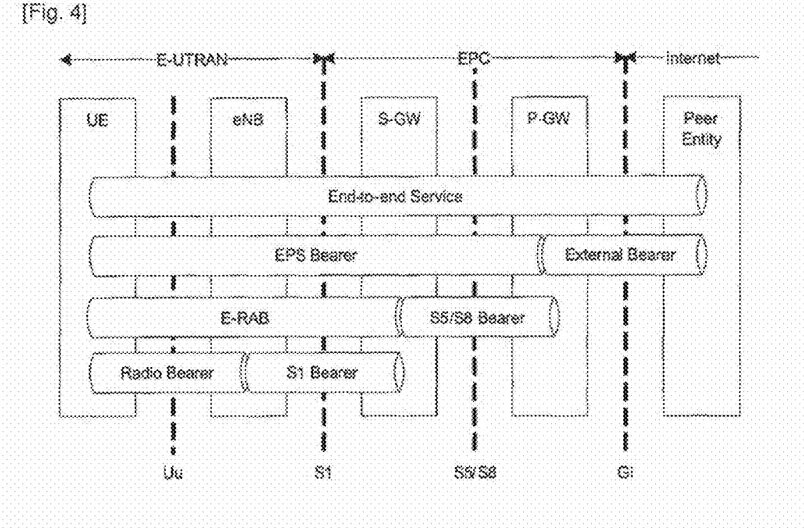
FIG. 4 is an exemplary view illustrating the bearer service structure of an LTE system.

First, a bearer service architecture of the LTE system will be described. FIG. 4 is an exemplary view illustrating a bearer service architecture of the LTE system. Typically, Radio Bearer is a bearer provided in a Uu interface to support the user's service. In 3GPP, each bearer is defined for each interface as illustrated therein to guarantee independence between those interfaces. Specifically, bearers provided by LTE system are commonly called an Evolved Packet System (EPS) bearer, which can be divided into Radio Bearer, S1 Bearer, and the like, for each interface as illustrated in FIG. 4.

In FIG. 4, Packet Gateway (P-GW) is a network node for connecting between the LTE network and another network, and EPS Bearer provided by the LTE system is defined between LIE and P-GW. The EPS Bearer is subdivided between individual nodes of the LTE system, and defined as Radio Bearer between UE-eNB, S1 Bearer between eNB-S-GW, and S5/S8 Bearer between S-GW and P-GW. Each bearer is defined through quality of service (QoS), and the QoS may include data rate, error rate, delay, and the like. Accordingly. QoS that should be totally provided by an LTE system is defined as a EPS bearer, and then each QoS is determined for each interface, and the bearer is set for each interface according to the QoS that should be provided by itself. Since the bearer of each interface is provided by dividing a total EPS bearer into sections, the EPS bearer and other bearers, such as Radio Bearer, S1 Bearer, and the like are all one-to-one relationships.

Hereinafter, a Long-Term Evolution Advanced (LTE-A) system will be described. The LTE-A system is a system that has been developed from an LTE system to meet IMT-Advanced conditions, which are the fourth generation mobile communication conditions recommended by the International Telecommunication Union-Radiocommunication Sector (ITU-R). At present, the LTE-A system standard is actively under development by 3GPP that has developed the LTE system standard. Representative technologies newly added in the LTE-A system mi carrier aggregation technology for extending a used bandwidth to be flexibly used, and relay technology for increasing coverage, supporting group mobility, and allowing network arrangement.

Figure 5:
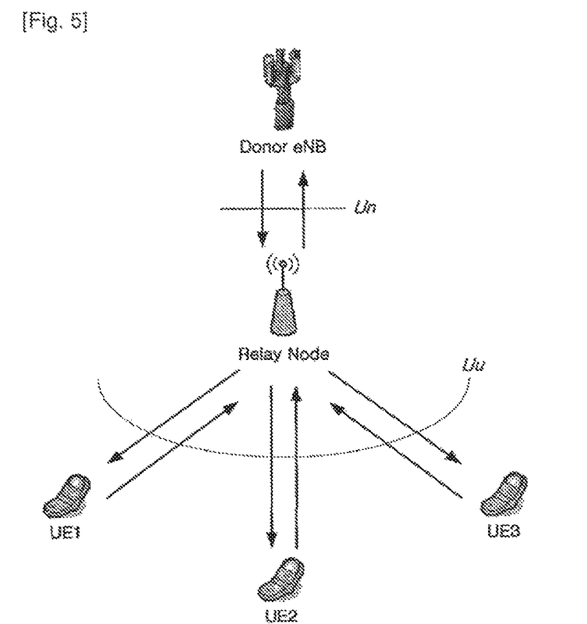
FIG. 5 is an exemplary view illustrating a relay node (RN) in an LTE-A system to which the present invention is applied.

Here, relay is a technology for relaying data between a user equipment (EU) and an Evolved Node B (eNB, base station). Since communication is not smoothly implemented in case where a distance between UE and eNB is far in the LTE system, it is introduced in an LTE-A system as a method of making up for the problem. A new network node, which is referred to as Relay Node (RN), is introduced between UE and eNB to perform such a relay operation, wherein the eNB for managing RN is called Donor eNB (DeNB). In addition, an interface between RN-DeNB that has been newly added due to RN is defined as an Un interface, thereby being differentiated from a Un interface that is an interface between UE and a network node. FIG. 5 illustrates such a concept of Relay Node and an Un interface.

Here, the RN serves to manage UE in behalf of the DeNB. In other words, from a standpoint of the UE, the RN is shown as DeNB, and therefore, MAC/RLC/PDCP/RRC, which is an Uu interface protocol that has been used in a conventional LTE system, are used as they are in a Uu interface between UE-RN.

From a standpoint of the DeNB, the RN may be shown as UE or shown also as eNB according to circumstances. In other words, when the RN is first accessed to the DeNB, it is accessed through random access like UE because the existence of the RN is unknown to the DeNB, but operated like eNB managing UE connected to itself after the RN is once accessed to the DeNB. Accordingly, along with the Uu interface protocol, the functions of the Un interface protocol should be also defined as in the form to which a network protocol function is also added. For the Un interface protocol, discussions as to which functions should be added or changed to each protocol layer on the basis of Uu protocols such as MAC/RLC/PDCP/RRC are still in progress in 3GPP.

Figure 6:
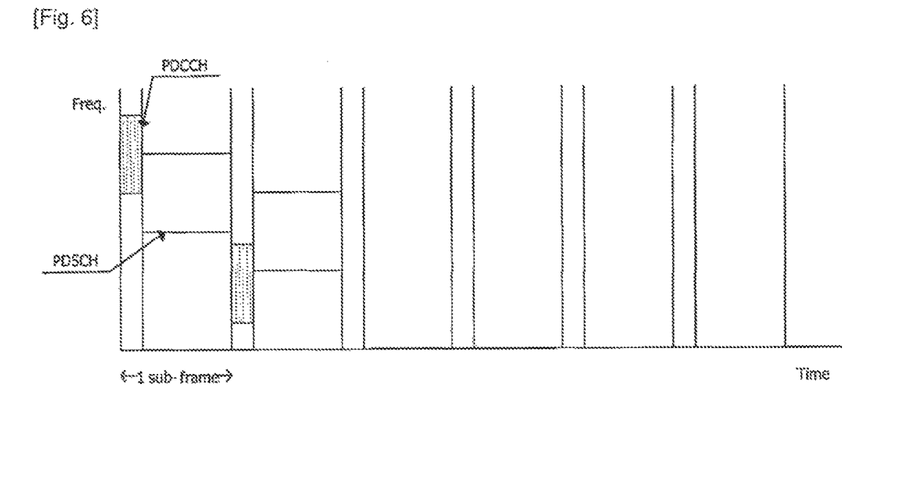
FIG. 6 is an exemplary view illustrating a method of receiving data in a downward direction.

Next, there will be described a method in which the UE receives data in a downward direction in an LTE system. FIG. 6 is an exemplary view illustrating a method of receiving data in a downward direction.

As illustrated in FIG. 6, a physical channel in a downward direction can be roughly divided into two types, such as a Physical Downlink Control Channel (PDCCH) and a Physical Downlink Shared Channel (PDSCH). Here, control information, which is not directly related to the transmission of user data but required for operating a physical channel, is transmitted over the PDCCH. To explain most briefly, the PDCCH can be also used to control other physical channels. In particular, the PDCCH is used to transmit information that is required to receive the PDSCH. Information as to at a specific timing, data to be transferred using a specific frequency bandwidth, for a certain UE, a certain size of data to be transferred, and the like will be transmitted over the PDCCH. Accordingly, each UE receives the PDCCH at a specific Time Transmission Interval (TTI), checks whether or not data that should be received by itself is transmitted, and additionally receives the PDSCH using information such as the frequency indicated by the PDCCH, and the like if notified that data that should be received by itself is transmitted. Information as to data of the PDSCH to be transmitted to a certain UE(s) (a single or a plurality of UEs), how to receive and decode PDSCH data by the UEs, and the like can be included in a Physical Downlink Control Channel (PDCCH) to be transmitted.

For example, in a specific subframe, it is assumed that radio resource information (for example, frequency position) called "A" and transport type information (for example, transport block size, modulation and coding information, etc.) called "B" are CRC-masked to an Radio Network Temporary Identity RNTI (RNT) called "C", and transmitted via the PDCCH. One or two or more UEs located in the relevant cell monitor the PDCCH using their RNTI information, and on the above assumption, when the UE having the RNTI called "C" decodes the PDCCH, a CRC error does not occur. Thus, the UE decodes the PDSCH to receive data by using the transport type information called "B" and the radio resource information called "A". On the contrary, on the above assumption, if the UE does not have the RNTI called "C" when the PDCCH is decoded, a CRC error occurs. Thus, the UE does not receive the PDSCH.

In the above procedure, the Radio Network Temporary Identifier (RNTI) is transmitted to inform to which UEs radio resources have been allocated. The RNTI includes a dedicated RNTI and a common RNTI. The dedicated RNTI is allocated to a single UE and used to transmit or receive data corresponding to the UE. The dedicated RNTI is allocated only to the UE whose information has been registered in the base station. On the contrary, the common RNTI is used when UEs, which have not been allocated the dedicated RNTI because their information was not registered to the base station, transmit or receive data to or from the base station, or the common RNTI is used to transmit information commonly applied for a plurality of UEs.

Hereinafter, a RRC_IDLE state of the UE will be described in detail. The UE in the RRC_IDLE state should always select the cell having a suitable quality to be prepared to receive services through this cell. For example, the UE that has just powered on should select the cell having a suitable quality to be registered in a network. If the UE that has been in a RRC_CONNECTED state enters into RRC_IDLE, then the UE should select a cell to stay in RRC_IDLE. As described above, a process in which the UE selects the cell satisfying certain conditions to stay in a service waiting state such as the RRC-IDLE state is called cell selection.

Hereinafter, a method of selecting a cell by the UE will be described. When power is initially turned on, the UE searches available PLMNs and then selects a suitable PLMN capable of receiving services. Subsequently, the UE selects a cell having signal qualities and characteristics capable of receiving a suitable service among the cells provided by the selected PLMN. Here, the cell selection process is roughly divided into two types. First, for an initial cell selection process, the UE have no previous information about radio channels. Thus, the UE searches all radio channels to find a suitable cell. In each channel, the UE finds the strongest cell. Then, once the UE finds a suitable cell satisfying the cell selection criteria, the UE selects the relevant cell. Next, in a cell selection process using the stored information, a cell is selected by using information stored in the UE for radio channels or using information broadcast from the cells during the process. Thus, a cell selection can be promptly performed compared to an initial cell selection process. Once the UE finds a suitable cell satisfying the cell selection criteria, the UE selects the relevant cell. If a suitable cell satisfying the cell selection criteria is not found through this process, then the UE performs an initial cell selection process.

Hereinafter, a process of reselecting a cell will be described. After a certain cell is once selected through a cell selection process, a signal intensity or quality between the UE and the base station may vary due to mobility of the UE, change of radio environments, or the like. Thus, if the quality of the selected cell is deteriorated, then the UE can select another cell providing a better quality. In case of reselecting a cell in this manner, the cell providing a better signal quality than the currently selected cell is typically selected. This process is called cell selection. The cell reselection process, from a viewpoint of the quality of a radio signal, has a basic purpose to typically select a cell providing the best quality to the UE. In addition to the viewpoint of the quality of a radio signal, a network can determine a priority for each frequency to inform the priority to the UE. The UE that has received such a priority preferentially considers this priority during the cell reselection process compared to the radio signal quality criteria.

Figure 7:
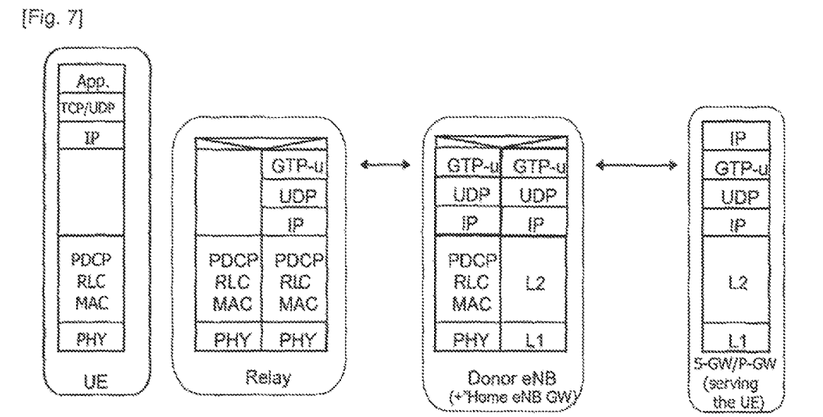
FIG. 7 is an exemplary view illustrating an overall protocol architecture including a UE accessed to the RN.

FIG. 7 is an exemplary view illustrating an overall protocol architecture including a UE accessed to the RN. An IP packet generated by the UE is passed through PDCP/RLC/MAC/PHY of the UE, and passed through PHY/MAC/RLC/PDCP at a side of the Uu interface of the RN, and transferred to an upper stage of the RN. The RN additionally attaches GTP-u/UDP/IP to the IP packet received form the UE and transfers the attached IP packet to DeNB through PDCP/RLC/MAC/PHY at a side of the Un interface. Here, IP/UDP additionally attached by the RN is used to properly transfer the IP packet received by the DeNB from the UE to S-GW/P-GW corresponding to the UE. The GTP-u header is used to differentiate IP packets that have been actually generated by the UE or that should be transferred to the UE, within the packets using the same IP/UDP.

Hereinafter, a RLC layer will be described in more detail. As previously described above, there exist three modes, TM, UM, and AM in the RLC layer. However, in case of TM, there is few functions that can be performed in RLC, and therefore, only UM and AM will be described herein.

UM RLC sends each PDU by attaching a PDU header including a sequence number (hereinafter, abbreviated as "SN"), thereby allowing the receiver side to know which PDU is lost during transmission. Owing to this function, the UM RLC mainly takes charge of transmission of broadcast/multicast data or transmission of real-time packet data such as voice of packet service domain (hereinafter, abbreviated as "PS domain") (for example, VoIP) and streaming in the user plane, or takes charge of transmission of a RRC message requiring no acknowledgement among the RRC messages transmitted to a specific UE or specific UE group within a cell in the control plane.

Similarly to the UM RLC, AM RLC configures PDU by attaching a PDU header including SN at the time of configuring the PDU. Yet, the AM RLC differs from the UM RLC in that a receiver side makes acknowledgement to PDU transmitted by a transmitter side. The reason why the receiver side makes acknowledgement in the AM RLC is because the transmitter side makes a request for retransmission of PDU failing to be received by the receiver side itself, and this retransmission function is the most outstanding feature of the AM RLC. So, the object of the AM RLC is to guarantee error-free data transmission through retransmission. Owing to this object, the AM RLC mainly takes charge of transmission of non-real-time packet data such as TCP/IP of PS domain in the user plane or performs transmission of a RRC message necessarily requiring acknowledgment among the RRC messages transmitted to a specific UE within a cell in the control plane.

In view of the aspect of directionality, UM RLC is used for uni-directional communications, whereas AM RLC is used for bi-directional communications due to feedback from a receiver side. Also, there exists a difference in the structural aspect. One RLC entity includes a transmission or reception structure in the UM RLC, whereas both transmitter and a receiver sides exist within one RLC entity in the AM RLC.

The complexity of the AM RLC is due to the retransmission function. For re-transmission management, the AM RLC has a retransmission buffer in addition to a transmission/reception buffer, and performs various functions, such as using of a transmitting/receiving window for flow control, polling in which a transmitter side requests status information to a receiver side of a peer RLC entity, a status report in which a receiver side reports its own buffer status to a transmitter side of the peer RLC entity, a status PDU configuration for carrying status information, and the like. In addition, various protocol parameters, status variables and timers are required in the AM RLC to support these functions. The PDU used to control data transmission in the AM RLC such as status report, status PDU, or the like is called control PDU and the PDU used to transfer user data is called data PDU.

If there exists data unable to be received properly, the AM RLC at a receiver side informs the fact to the AM RLC at a transmitter side to request retransmission. This is call status report, and transmitted using STATUS PDU which is one of control PDUs. According to the status report received from the receiver side, the transmitter side retransmits data blocks, reported that have been not been properly received by the receiver side.

Figure 8:
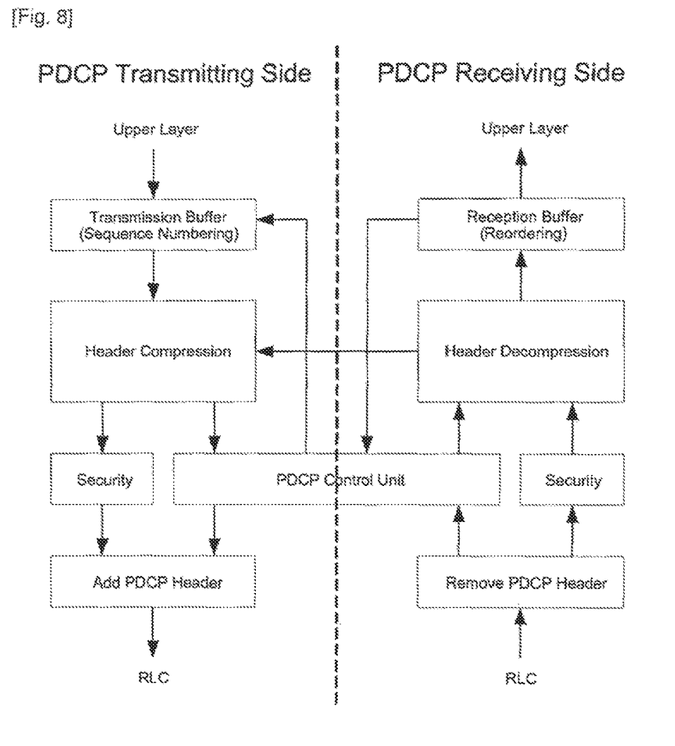
FIG. 8 is an exemplary view illustrating the architecture of a PDCP entity.

Hereinafter, a PDCP entity will be described in detail. The PDCP entity is upwardly connected to a RRC layer or user application, and downwardly connected to a RLC layer, and the detailed architecture thereof is as follows. FIG. 8 is an exemplary view illustrating the architecture of a PDCP entity. The blocks illustrated in FIG. 8 are functional blocks, and may differ from actual implementation.

One PDCP entity may include a transmitter side and a receiver side as illustrated in FIG. 8. The transmitter side on the left performs a role of configuring SDU received from the upper layer or control information generated by the PDCP entity itself as PDU to transmit to a receiver side of the peer PDCP entity, and the receiver side on the right performs a role of extracting PDCP SDU or control information from the PDCP PDU received from a transmitter side of the peer PDCP entity.

As described above, there are two kinds of PDUs, data PDU and control PDU, which are generated by the transmitter side of the PDCP entity. First, PDCP Data PDU is a data block made in PDCP by processing SDU received from the upper layer, and PDCP Control PDU is a data block generated by PDCP itself for the PDCP to transfer control information to the peer entity.

The PDCP Data PDU is generated in RB of both the user plane and control plane, and some of the PDCP functions are selectively applied according to the used plane. In other words, a header compression function is applied only to U-plane data, and an integrity protection function within the security function is applied only to C-plane data. The security function may also include a ciphering function for maintaining the security of data in addition to the integrity protection function thereof, and the ciphering function is applied to both U-plane and C-plane data.

The PDCP Control PDU is generated only in U-plane RB, and may include roughly two types, such as a PDCP status report for informing a transmitter side of the situation of a PDCP reception buffer, and a header compression (HC) feedback packet for informing a header compressor of the situation of a header decompressor.

The PDCP status report is transmitted from a receiver-side PDCP to a transmitter-side PDCP. Through this, the receiver-side PDCP informs the transmitter-side PDCP which PDCP SDU is received or not received, thereby allowing the received PDCP SDU not to be retransmitted or allowing the unreceived PDCP SDU to be retransmitted. Such a PDCP status report is transmitted in the form of PDCP STATUS PDU, and the architecture thereof is illustrated in FIG. 9.

Figure 9:
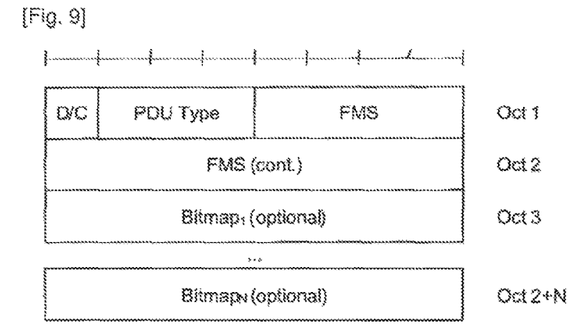
FIG. 9 is an exemplary view illustrating the architecture of PDCP STATUS PDU.

The definition of each field or element illustrated in FIG. 9 is as follows.

D/C (Data/Control): 1 bit
  Informs whether relevant PDU is data PDU or control PDU.
PDU Type: 3 bits
  Informs a kind of the control PDU.
  "000" is PDCP Status Report. "001" is Header Compression Feedback information, and remaining values are reserved.
FMS (First Missing SN): 12 bits
  SN of the PDCP SDU that cannot be received first at a receiver side.
Bitmap: variable length
  Denotes reception failure if the relevant bit position of the bitmap field is "0", and reception success if the relevant bit position of the bitmap field is "1".

The PDCP status report as described above is currently used at the time of performing handover in an LTE system. First, the transmitter-side PDCP stores PDCP SDUs transferred from the upper layer in a transmission buffer even after their transmission for re-transmission that may be later required. Then, when handover occurs, the transmitter-side PDCP receives information on PDCP SDU that has been received by a receiver-side PDCP as well as PDCP SDU that has not been received by the receiver-side PDCP through a PDCP status report, and retransmits PDCP SDU that has not received by the receiver-side PDCP after the handover. Particularly, in a side of the network, eNB is changed from the source to the target if handover occurs, thereby changing the PDCP entity, and thus re-transmission using such a status report is necessarily required.

As previously described above, according to the present invention, it is proposed a method of effectively transmitting or receiving data blocks between RN and EU in an LTE-A system.

For this purpose, according to the present invention, DeNB has a plurality of protocol layers, and each of the protocol layers is connected to a protocol layer of another node, respectively. Then, each protocol layer transmits and/or receives reception status reports to and/or from a protocol layer of the node connected with itself. In other words, the transmitter side of each protocol layer deletes data blocks informed that has been successfully received by the receiver side, based on a reception status report received from the receiver side. Accordingly, data blocks informed that has not been successfully received by the receiver side is retransmitted. Furthermore, if there exists any data block that has not been successfully received, the receiver side of each protocol layer informs the fact to the transmitter side using a reception status report. In the above process, the protocol layer is a DPCP/RLC/RRC layer, and the node is DeNB/RN/UE.

According to another embodiment of the present invention, it is proposed that a plurality of protocol layers are provided between RN and DeNB, and one of those protocol layers is used to transfer information between UE and RN.

In other words, RN and DeNB are provided with two or more protocol layers, and at least one protocol layer of them takes charge of transmission and reception of data blocks, and the remaining protocol layers are used to transmit or receive information of a certain protocol layer between UE and RN.

Figure 10:
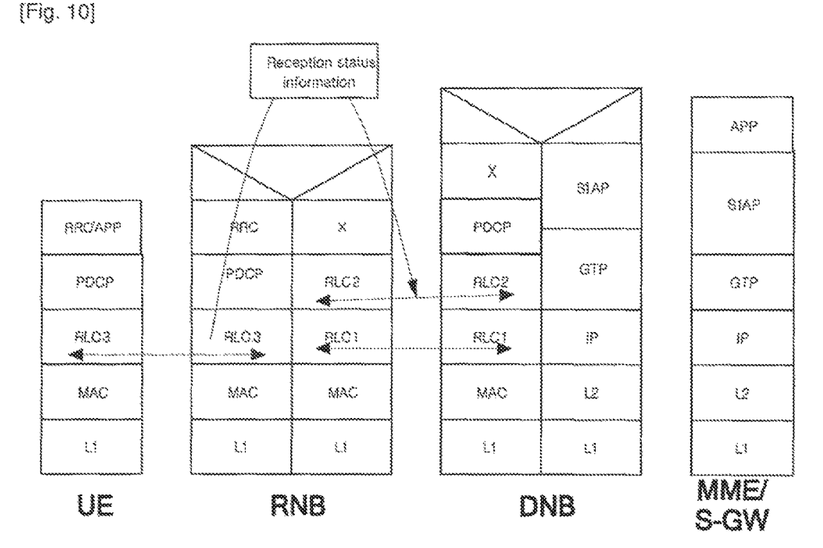
FIG. 10 is an exemplary view illustrating the operation of transmitting or receiving data while preventing transmission error of data at the time of using the RN according to the present invention.

FIG. 10 is an exemplary view illustrating the operation of transmitting or receiving data while preventing transmission error of data at the time of using the RN according to the present invention.

As illustrated in FIG. 10, RLC 1 takes charge of transmission and reception of data between RN and DeNB. Here, the RLC 1 is considered as a conventional AM RLC. Thus, the RLC 1 performs a role of transferring data transferred from the DeNB to the RN and data transferred from the RN to the DeNB without error or loss. RLC 3 takes charge of transmission and reception of data between the RN and UE. Here, the RLC 3 is also considered as a conventional AM RLC. As a result, the RLC 3 performs a role of transferring data transferred from the UE to the RN and data transferred from the RN to the UE without error or loss.

As illustrated in FIG. 10. RLC 2 performs a role of transferring information of the RLC 3. Preferably, the RLC 2 transfers transmission and reception confirmation information (RLC status report) which is exchanged in the RLC 3. For example, the RN transmits data transferred from the DeNB to a UE through the RLC 3. The UE receives data blocks from the RN through the RLC 3, and transfers transmission and reception confirmation information on this to the RN through the RLC 3. The RN transfers the transmission and reception confirmation information received from the UE through the RLC 3 to the DeNB by including the transmission and reception confirmation information of the RLC 2.

For example, it is assumed that there are five data blocks to be transferred from the DeNB to the UE, having sequence numbers, such as 1, 2, 3, 4, and 5. First, the DeNB data blocks 1/2/3/4/5 will be transmitted to the RN. For the data blocks 1/2/3/4/5 transferred from the DeNB, the RN transfers information as to data blocks which have been successfully received and data blocks which have not been successfully received. All of those operations are performed by RLC 1.

Here, however, the RN will transmit data blocks 1/2/3/4/5 received from the DeNB to the UE. For the data blocks 1/2/3/4/5 transferred from the RN, the UE will configure and transmit information as to data blocks which have been received and data blocks which have not been received, to the DeNB using RLC 3.

If the UE informs the RN that data blocks 2/4 are not received using the RLC 3, then the RN will inform the DeNB that the UE has not received data blocks 2/4 using transmission and reception confirmation information in RLC 2.

In brief, both RLC 2 and RLC 1 are set between relay and DeNB to transfer transmission and reception confirmation information. RLC 1 transfers information as to data blocks that have successfully received or have not successfully received by the relay itself among data that had been transmitted from DeNB to the DeNB, whereas RLC 2 transfers information as to data blocks that have successfully received or have not successfully received by UE connected to the relay among data that had been transmitted from DeNB to the RN. The operations described in the above process will be also applicable to a PDCP layer. In other words, transmission and reception confirmation information between UE and RN may be transmitted through PDCP which has been set between RN and DeNB.

According to still another embodiment of the present invention, it is proposed that transmission and reception confirmation information sent from a relay to DeNB may include transmission and reception confirmation information transmitted from UE to the relay.

For example, if RLC 1 of DeNB transmits data blocks to RLC 1 of RN and the RLC 3 of the RN transmits data blocks received from the RLC 1 to UE, then RLC 3 of the UE transmits transmission and reception confirmation information to the RLC 3 of the RN based on the data blocks that have been received from the RN. The RLC 1 of the RN configures transmission and reception confirmation information based on the transmission and reception confirmation information that have been transferred from the RLC 3 of the UE to the RLC 3 of the RN, thereby transmitting to RLC 1 of DeNB. In other words, in this case, the transmission and reception confirmation information transmitted from RLC 1 is not information between DeNB and RN, but information between RN and UE. For example, even though RN has successfully received data blocks 1/2 form DeNB, the RN informs the DeNB that the data blocks 1/2 are not successfully received if the data blocks are not properly transferred to UE.

In addition, according to the present invention, there is provided a method of safely protecting data that is transmitted or received by UE.

Figure 11:
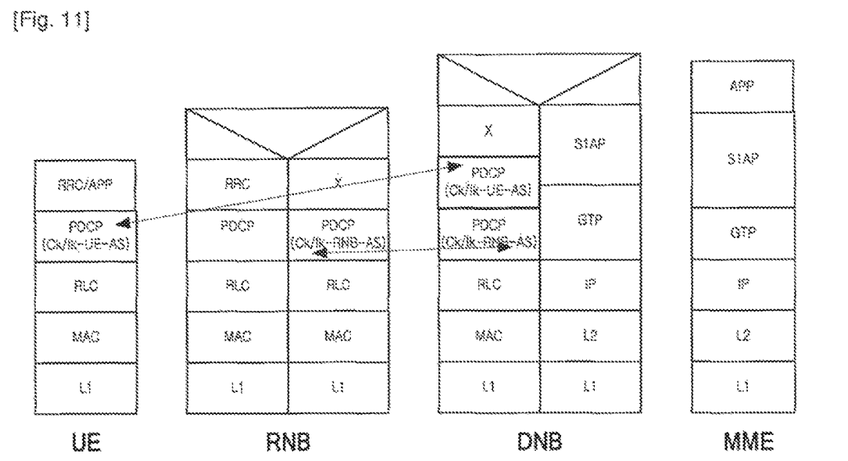
FIG. 11 is an exemplary view illustrating the operation of transmitting or receiving data while maintaining the security according to the present invention.

FIG. 11 is an exemplary view illustrating the operation of transmitting or receiving data while maintaining the security at the time of using RN according to the present invention. The elements illustrated in FIG. 11 are defined as follows. Ck: ciphering key, CK-UE-AS: ciphering key used for a specific UE in AS level, CK-UE-NAS: ciphering key used for a specific UE in NAS level, CK-RNB-AS: ciphering key used for a specific RNB in AS level, Ik->Integrity Key, IK-UE-AS: Integrity key used for a specific UE in AS level, IK-UE-NAS: Integrity key used for a specific UE in NAS level, IK-RNB-AS: Integrity key used for a specific RNB in AS level, In each case, the transmit ciphers/integrity-protects the transmitted PDU with configured keys and the receiver de-ciphers/integrity-checks the received PDU with configured keys.

In other words, if data to be transferred to the UE is received from MME/S-GW, then DeNB preferentially apply security to the data using an integrity key (IK) value and ciphering key (CK) value set to 1:1 with the UE. Furthermore, the DeNB apply security to the data using IK and CK values set between a relay and DeNB.

In downlink direction: DeNB ciphers PDCP SDU (data block for a UE) using the key shared between UE and DNB. The result is PDCP PDU 1. Then, the DNB ciphers PDCP PDU 1 using the key shared between RN and DeNB. The result is PDCP PDU 2, and such PDCP PDU 2 (RLC SDU 1) is delivered to lower layer. When RN receives a RLC SDU 2 (PDCP PDU 3), the RN deciphers the RLC SDU 2 using the key shared between RN and DeNB. The result is PDCP PDU 4, and then, the RN transmits PDCP PDU 4 toward a UE. When the UE receives a PDCP PDU 4, it deciphers this PDU using the key shared between the UE and DeNB. Preferably, the same SN can be used for step 1 and step 2.

In UL direction: when UE transmits a PDCP SDU 5, it ciphers this SDU using the key shared between UE and DeNB. When RN receives PDCP PDU 5 from UE, the RN ciphers this using the key shared between RN and DeNB. The result is PDCP PDU 6. When, the DeNB receives a PDCP PDU 6 from RN, it deciphers this using the key shared between the RN and DeNB. The result is PDCP PDU 7. The DeNB deciphers PDCP PDU 7 using the key shared between the UE and DeNB. The result is PDCP SDU. Preferably, the same SN can be used for step 1 and step 2.

Figure 12:
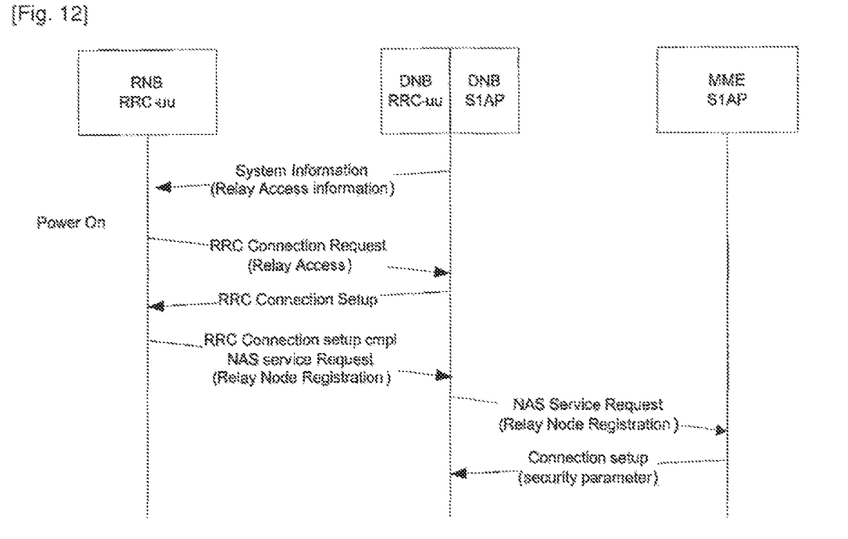
FIG. 12 is an exemplary view illustrating the operation of controlling an access of RN to DeNB and an access of UE to RN according to the present invention.

In addition, according to the present invention, there is provided an effective access control method in an LTE-A system. Thus, according to the present invention, it is proposed that eNB transmits RN access control information (Relay Access information) to UEs. FIG. 12 is an exemplary view illustrating the operation of controlling an access of RN to DeNB and an access of UE to RN according to the present invention. The RN access control information may include information as to whether or not RN can access the relevant cell or information as to whether or not the relevant eNB and the relevant cell supports RN. The RN that has received the RN access control information attempts to access the cell only if the relevant RN access control information allows an access of the RN. Then, the RN that has received the RN access control information does not attempt to access the cell if the relevant RN access control information does not allow an access of the RN. Then, if the relevant cell does not transmit RN access control information, the RN entered in a certain cell considers that the relevant cell does not support, and thus the RN does not attempt an access to the relevant cell. During the process, if a cell to which the RN has entered does not support an access to the RN or doe not allow the access, the RN selects and enters into another new cell. Attempting an access during the process means to perform a RRC Connection Establishment process. Additionally, during the process, the RN informs eNB or a core network that it is a RN. Preferably, the information may be included in the RRC Connection Establishment process. Furthermore, during the process, the RN additionally informs eNB or a core network that it is a fixed-type RN or mobile-type RN. If the RN is fixed, then the RN will not perform handover, and thus eNB may not perform measurement configuration to the RN, and also the RN will not send a measurement report to the eNB. It will limit unnecessary signaling, thereby preventing the consumption of radio resources. The DeNB informs information as to whether or not the DeNB itself supports the RN using the relay access information. If the relay access information allows an access of the RN, then the RN transmits RRC Connection Request to the DeNB to request an access. During the process, the RN may inform that the RN itself is a relay when transmitting RRC Connection Request, Then, the RN may inform a core network that it is a RN through Relay Node Registration using a NAS message.

According to another embodiment of the present invention, for example, if a bandwidth of 1 Mb/s is required for each voice communication, and a certain DeNB can allocate radio resources corresponding to a bandwidth of 10 Mb/s to a certain RB, then the RN may support the voice communications of 10 lines to the maximum for UEs connected to the RN itself. However, if 10 persons now use voice communications among the UEs connected to the RN, then the RN should prevent a new UE from being accessed to the RN to perform voice communication. Preferably, the new UE should select a RN or cell which is different from the RN. Thus, according to the present invention, there is provided a method in which the RN can effectively perform call admission control (CAC). Preferably, when a new UE attempts an access, it is proposed that the RN informs the DeNB that the new UE has attempted an access. At this time, the RN transfers the access request information of the UE to the DeNB. The access request information of the UE may include an identifier of the UE, a kind of service that the UE desires to receive, a radio resource amount of the UE, a priority of the UE, and the like. The DeNB checks whether or not the UE can be effectively supported based on the access request information of the UE received form the RN, and commands an access permission for the UE to the RN if the UE can be supported. The RN allows an access to the RN to set to a RRC connection only if the access permission is received through DeNB; otherwise, the RN rejects a RRC connection. During the process, if the RN rejects a RRC connection to the UE, then the RN may include information on neighboring cells or may inform information as to when the UE can attempt an access to the RN again.

Figure 13:
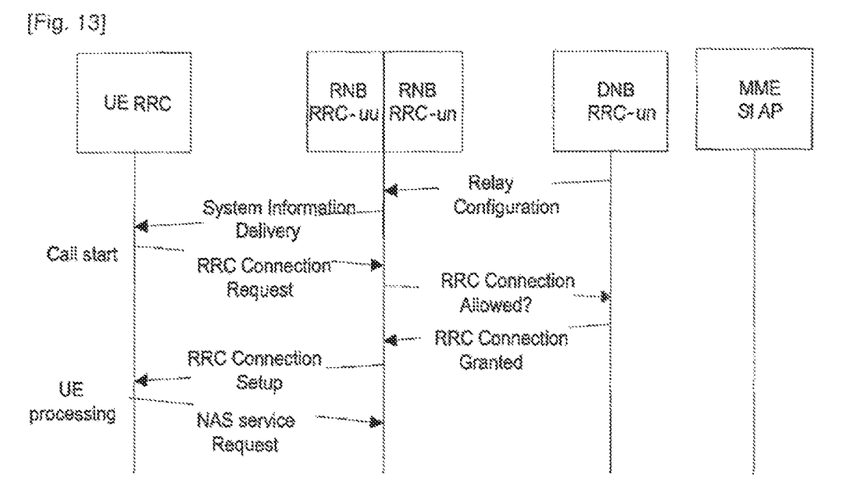
FIG. 13 is another exemplary view illustrating the operation of controlling an access of RN to DeNB and an access of UE to RN according to the present invention.

FIG. 13 is another exemplary view illustrating the operation of controlling an access of RN to DeNB and an access of UE to RN according to the present invention. As illustrated in FIG. 13, if the UE transmits RRC Connection Request to attempt an access, then the RN asks DeNB whether or not an access to the UE is allowed through a process of "RRC Connection Allowed." If the access is allowed through "RRC Connection Granted", then the RN transmits "RRC Connection Setup" to allow a RRC connection.

According to another method of the present invention, DeNB transfers information of a maximum radio allowance amount or maximum radio resource amount to RN. For example the radio resource amount information denotes a maximum number of voice communication users or maximum transmission bit rate. Thus, if a new UE attempts an access to the RN, and if a radio resource is allocated to the UE but exceeds the maximum number of voice communication users or maximum transmission bit rate instructed from the DeNB, then the RN does not allow an access to the UE. However, if a new UE attempts an access to the RN, and if a radio resource is allocated to the UE but does not exceed the maximum number of voice communication users or maximum transmission bit rate instructed from the DeNB, then the RN allows an access to the UE.

In other words, the DeNB can inform the RN of radio resource amount information through a Relay Configuration message as illustrated in FIG. 13. In addition, if the UE transmits RRC Connection Request to attempt an access, then the DeNB may determine whether or not it exceeds the set radio resource amount information, thereby determining whether or not radio access to be allowed or not to the UE.

According to the present invention, due to the introduction of a relay node in an LTE-A system, during a process of transferring data generated by the UE through a radio network to DeNB which is an end stage of a wired network, it may be possible to have an effect of reducing the loss of data blocks and securing the transmission quality of data.

The present invention may provide a method of reporting a status report in a wireless communication system, the method comprising: receiving, by a first protocol entity, data from a second protocol entity; transmitting, by the first protocol entity, the received data to a third protocol entity; receiving a status report from the third protocol entity, wherein at least one status report indicate any unsuccessfully received data by the third protocol entity: and transmitting the status report to the second protocol entity, wherein the first protocol entity is a Relay Node (RN) entity, the second protocol entity is a Donor eNB (DeNB), the third protocol entity is a User Equipment (UE), the all steps are performed by a Relay Node (RN) entity, the second protocol entity retransmits the data to the first entity upon receiving the status report, the all steps are performed in an acknowledged mode radio link control (AM RLC) layer, and the all steps are performed in a Packet Data Convergence Protocol (PDCP) layer.

Hereinafter, a terminal according to the present invention will be described.

A terminal according to the present invention may includes all types of terminals capable of using services that can transmits and/or receives data to and/or from each other in a wireless environment. In other words, a terminal according to the present invention may be used in a comprehensive meaning by including a mobile communication terminal (for example, user equipment (UE), portable phone, cellular phone, DMV phone, DVB-H phone, PDA phone. PTT phone, and the like), a notebook, a laptop computer, a digital TV, a GPS navigation, a potable gaming device, an MP3, other home appliances, and the like.

A terminal according to the present invention may include a basic hardware architecture (transmission and/or reception unit, processing or control unit, storage unit, and the like)

required to perform the function and operation for effectively receiving the system information as illustrated in the present invention.

The method according to the present invention as described above may be implemented by software, hardware, or a combination of both. For example, the method according to the present invention may be stored in a storage medium (for example, internal memory, flash memory, hard disk, and the like, in a mobile terminal or base station), and may be implemented through codes or instructions in a software program that can be implemented by a processor (for example, microprocessor, in a mobile terminal or base station), and the like.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of establishing a Radio Resource Control (RRC) connection in a wireless communication system, the method comprising:
    transmitting, from a Relay Node (RN), a RRC connection request message to a Donor eNB (DeNB);
    receiving, by the RN, a RRC connection setup message from the DeNB in response to the transmitted RRC connection request message; and
    transmitting, from the RN, a RRC connection setup complete message to the DeNB after the reception of the RRC connection setup message,
    wherein the steps of transmitting the RRC connection request message, receiving the RRC connection setup message, and the transmitting the RRC connection setup complete message are performed during a RRC connection establishment, and
    wherein the RRC connection setup complete message indicates that the RRC connection is for the RN only when the RRC connection setup complete message includes information indicating that the RRC connection is for the RN.

2. The method of claim 1, wherein, when a User Equipment (UE) receives a Packet Data Convergence Protocol (PDCP) Protocol Data Unit (PDU), a ciphering key is used to decipher the received PDCP PDU.

3. The method of claim 1, wherein the RRC connection setup complete message is set by a User Equipment (UE).

4. The method of claim 1, wherein the RRC connection setup complete message is used to confirm a successful completion of the RRC connection establishment.

5. The method of claim 1, wherein the information indicating that the RRC connection is for the RN includes an identity (ID) of the RN.

6. A method of establishing a Radio Resource Control (RRC) connection in a wireless communication system, the method comprising:
    transmitting, from a mobile terminal, a RRC connection request message to a base station;
    receiving, by the mobile terminal, a RRC connection setup message from the base station in response to the transmitted RRC connection request message; and
    transmitting, from the mobile terminal, a RRC connection setup complete message to the base station after the reception of the RRC connection setup message by the mobile terminal,
    wherein the steps of transmitting the RRC connection request message, receiving the RRC connection setup message, and the transmitting the RRC connection setup complete message are performed during a RRC connection establishment, and
    wherein the RRC connection setup complete message indicates that the RRC connection is for the RN only when the RRC connection setup complete message includes information indicating that the RRC connection is for the RN.

7. The method of claim 6, wherein, when the mobile terminal receives a Packet Data Convergence Protocol (PDCP) Protocol Data Unit (PDU), a ciphering key is used to decipher the received PDCP PDU.

8. The method of claim 6, wherein the RRC connection setup complete message is configured by the mobile terminal.

9. The method of claim 6, wherein the RRC connection setup complete message is used to confirm a successful completion of the RRC connection establishment.

10. The method of claim 6, wherein the information indicating that the RRC connection is for the RN includes an identity (ID) of the RN.

11. An apparatus for establishing a Radio Resource Control (RRC) connection in a wireless communication system, the apparatus comprising:
- a memory;
- a transceiver; and
- a processor, the processor configured to:
    - transmit, from a mobile terminal, a RRC connection request message to a base station;
    - receive a RRC connection setup message from the base station in response to the transmitted RRC connection request message; and
    - transmit a RRC connection setup complete message to the base station after the reception of the RRC connection setup message by the mobile terminal,
- wherein the RRC connection request message is transmitted, the RRC connection setup message is received, and the RRC connection setup complete message is transmitted during a RRC connection establishment, and
- wherein the RRC connection setup complete message indicates that the RRC connection is for the RN only when the RRC connection setup complete message includes information indicating that the RRC connection is for the RN.

12. The apparatus of claim 11, wherein, when the mobile terminal receives a Packet Data Convergence Protocol (PDCP) Protocol Data Unit (PDU), a ciphering key is used to decipher the received PDCP PDU.

13. The apparatus of claim 11, wherein the RRC connection setup complete message is configured by the mobile terminal.

14. The apparatus of claim 11, wherein the RRC connection setup complete message is used to confirm a successful completion of the RRC connection establishment.

15. The apparatus of claim 11, wherein the information indicating that the RRC connection is for the RN includes an identity (ID) of the RN.

* * * * *